US006284176B1

(12) United States Patent
Oujiri

(10) Patent No.: US 6,284,176 B1
(45) Date of Patent: *Sep. 4, 2001

(54) INDUSTRIAL PRECURSOR FOR THE USE IN CONSTRUCTION MATERIAL PRODUCTION AND METHOD OF PRODUCING SAME

(75) Inventor: František Oujiri, Dobrichovice (CZ)

(73) Assignee: Futuristic Tile, L.L.C., Allenton, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,715

(22) Filed: Dec. 11, 1997

(51) Int. Cl.$^7$ ............................. B29C 47/00; C03B 19/06
(52) U.S. Cl. ..................... 264/113; 264/112; 264/125; 264/140; 264/141; 264/142; 264/177.11; 65/17.3
(58) Field of Search ..................... 264/140, 141, 264/142, 125, 112, 113, 177.11; 65/21.1, 17.3

(56) References Cited

U.S. PATENT DOCUMENTS

| | | |
|---|---|---|
| 1,185,555 | 5/1916 | Thomas . |
| 1,341,979 | 6/1920 | Gronroos . |
| 1,813,901 | 7/1931 | Bayne . |
| 3,546,061 | 12/1970 | Kraemer et al. . |
| 3,883,337 | 5/1975 | Helgesson et al. . |
| 3,963,503 | 6/1976 | Mackenzie . |
| 4,054,435 | 10/1977 | Sakane et al. . |
| 4,173,609 | 11/1979 | Engstrom . |
| 4,187,266 | 2/1980 | Greskovich et al. . |
| 4,225,443 | * 9/1980 | Harris et al. ............................. 106/40 |
| 4,313,900 | 2/1982 | Gonzales, Jr. et al. . |
| 4,818,731 | 4/1989 | Mizutani et al. . |
| 4,833,015 | 5/1989 | Furuuchi et al. . |
| 4,946,636 | * 8/1990 | Brunetti et al. ........................ 264/141 |
| 5,080,959 | * 1/1992 | Tanaka et al. ........................ 264/332 |
| 5,296,180 | * 3/1994 | Hayes ..................................... 264/44 |
| 5,350,004 | 9/1994 | Rocazella et al. . |
| 5,425,909 | 6/1995 | Fu et al. . |
| 5,445,772 | 8/1995 | Uchida et al. . |
| 5,536,345 | 7/1996 | Lingart . |
| 5,678,165 | * 10/1997 | Wu ......................................... 419/37 |
| 5,720,835 | 2/1998 | Lingart et al. . |

FOREIGN PATENT DOCUMENTS

| | | |
|---|---|---|
| 715680 | 1/1942 | (DE) . |
| 41 25 698 C 1 | 11/1992 | (DE) . |
| 43 19 808 C 1 | 7/1994 | (DE) . |
| 1540546 | 9/1967 | (FR) . |
| 59 026935 | 2/1984 | (JP) . |
| 546569 | 5/1977 | (SU) . |

OTHER PUBLICATIONS

EPX Supplementary European Search Report, Jul. 31, 1998.
PCT International Search Report, Mar. 1, 1999.

* cited by examiner

Primary Examiner—James Derrington
(74) Attorney, Agent, or Firm—Foley & Lardner

(57) ABSTRACT

An industrial precursor suitable for making resilient construction materials for use in interior and exterior applications is produced by homogenizing a glassy material together with a plasticizer and suitable solvent. The homogenized material is extruded, dried, and ground into pellets. The industrial precursor may be stored indefinitely, and is processed into construction materials by packing the industrial precursor into a heat-resistant mold, and thermally treating the industrial precursor to sinter it into a construction material having a substantially defect-free surface and strong tensile strength.

18 Claims, No Drawings

INDUSTRIAL PRECURSOR FOR THE USE IN CONSTRUCTION MATERIAL PRODUCTION AND METHOD OF PRODUCING SAME

FIELD OF THE INVENTION

The invention pertains generally to the field of construction materials, and particularly to an industrial precursor produced from crushed slag, industrial or consumer waste glass and a plasticizer, for manufacturing construction materials, together with methods of its production.

BACKGROUND OF THE INVENTION

Waste products such as industrial slag and post-consumer and industrial waste glass are an increasing problem in today's society. Although methods of recycling such materials are known in the art, such methods are often not economically feasible. Typical recycling methods include high temperature processing wherein the waste glass or slag is utilized as a raw material where it is ground or milled to fine particle size and added to the other materials to produce fresh glass, melted, homogenized with the other ingredients and shaped by standard equipment in the industry to produce glass products.

Previously, waste glass and slag have been used together with sand or other mineral products, and the combination heat treated in various ways to produce construction materials such as tiles or slabs for use as floors or wall coverings of buildings.

However, previous methods for producing such tiles from slag or waste glass have suffered from several problems. First, previous methods require the presence of sand or other mineral components including sandstone, granite, ground brick, ceramic materials such as broken porcelain or mica, in their production. Such materials are expensive and add to the cost of production of the tile. Such added materials are often required to ensure that the resulting tile has the necessary mechanical strength and physical properties to withstand the harsh conditions to which the tile may be exposed.

Additionally, previous methods known in the art have required that the glass and/or slag, together with the sand and/or minerals, be mixed together with additional ingredients used to form the tiles or slabs, such as colorants and/or bonding agents, immediately prior to the materials being placed into a heat-resistant mold and heat treated to form the final tile product. This required expensive processing immediately before the production of the tile and required both processes to be carried out at the same site.

A need exists for a method of processing waste glass or slag into an intermediate industrial precursor product, such that the industrial precursor can be stored for an indefinite period of time and heat treated in any appropriate manner to produce a construction material which is resistant to weathering, corrosion, chemicals and abrasion, while maintaining a defect-free surface such that the finished construction material is of sufficient quality to be used as a replacement for natural and/or artificial construction materials such as marble and granite. Additionally, a need exists for an industrial precursor that can be used to prepare such construction materials that does not call for the presence of costly ingredients such as sand or minerals in its production.

SUMMARY OF THE INVENTION

In accordance with the invention an industrial precursor, useful for the production of construction materials such as tiles, slabs, or other decorative objects, and methods of making such industrial precursors, are provided.

In one embodiment, the present invention provides an industrial precursor comprising a glassy material selected from the group consisting of glass particles and slag, together with a plasticizer and a solvent. These materials are mixed together to produce a homogenous semisolid product which is then extruded and dried to form the industrial precursor. The extruded material may be cut into rods of the required dimension which are then dried, and in some cases, ground to particles of smaller dimensions. The industrial precursor may then be stored indefinitely until required for use in creating construction materials such as tiles, slabs or other decorative products.

In another embodiment of the present invention, a colorant is added to the industrial precursor during homogenization and mixing, to produce an industrial precursor having a distinct color that may be used alone, or in combination with one or more other industrial precursors of varying colors, to create a construction material which simulates natural and artificial stone products.

In a further embodiment of the present invention, the industrial precursor is placed into a heat-resistant mold and sintered to produce a construction material which will be used as a covering for floors, walls, and other appropriate places in interior and exterior settings.

In another embodiment of the present invention, a fixing agent is added in lieu of or in addition to the glassy material, plasticizer, solvent and colorant to create an industrial precursor. Separate industrial precursors each having a distinct color and containing a fixing agent may be placed in a heat-resistant mold to produce a pattern. The industrial precursor is then thermally treated to sinter the industrial precursor into a construction material such that the construction material exhibits sharp boundaries between the colors appropriate to the design of the construction material. If no fixing agent is added, the color boundaries of the construction materials will diffuse together to simulate the natural phenomenon seen in naturally occurring stones such as marble.

In a further embodiment of the present invention, an industrial precursor comprising a glassy material selected from the group consisting of glass particles and slag is mixed and homogenized together with a plasticizer, solvent and optionally including a fixing agent and/or one or more colorants and placed in a mold and thermally treated to produce a construction material with a minimized pore volume content such that a solid, rather than a foamed glass, construction material is produced.

In another embodiment of the present invention, a method of producing a construction material is disclosed. A plasticizer and a fine glass powder are blended together, and then further homogenized by the addition of water to the glass powder/plasticizer mixture to produce a semisolid material. The density of this product is increased by extrusion, followed by pelleting of the extruded product which is then dried to form the industrial precursor. The industrial precursor is then packed into a heat resistant mold in at least one layer, and sintered. The plasticizer is gradually burned off during this process. The industrial precursor is then subsequently cooled to ambient temperature to produce the construction material. The construction material is then brushed or polished to create the finished product, having a substantially defect-free outer surface.

DETAILED DESCRIPTION OF THE INVENTION

In the description that follows, a number of terms are utilized extensively. Definitions are herein provided to facilitate understanding of the invention.

Colorant:

Any metal oxide or compound which is typically used in the ceramic or glass industry for coloration of glass or ceramic materials. The chemical elements to produce the colorants may be of various oxidation states and typically include, but are not limited to, oxides of: Fe, Al, Si, Zn, Ca, Mg, Co, Cr, Zr, Pb, Ni, Mn, Mo, Cu, Sn, V, and Sb.

Fixing Agent:

A material which prevents disintegration of primary particles within the construction material during thermal treatment. Such materials are used to promote sharp boundaries between different colored construction materials which are used to produce a tile. Moreover, fixing agents help to prevent bubbles of gas from forming in the tile during thermal treatment and rising to the surface, helping to prevent defects from appearing in the surface of the resulting tile. Typical fixing agents include, but are not limited to: water glass; inorganic sols and metal alkoxides.

Glass:

Includes waste glass or dirty glass, i.e., glass collected from industrial and/or residential waste which contains impurities such as plastic particles, paper, metals, etc. Any pure, scrap or waste material comprising primarily glass or glass particles is within the definition of this term.

Glassy Material:

A non-metallic material which exhibits the hard, brittle, amorphous, chemical-resistant and physical-chemical properties that are typical for glass.

Inorganic Sols:

Peptized metal hydroxides in water or alcohol prepared by hydrolysis or precipitation of relevant inorganic salts or metal alkoxides. These metal hydroxides are typically hydroxides of chemical elements that include, but are not limited to: Si, Al and Ti.

Metal Alkoxides:

Compounds of metal and corresponding alcohol, which include, but are not limited to: aluminum isopropoxide, aluminum secbutoxide, titanium ethoxide and titanium propoxide.

Plasticizer:

Any material which holds particles of glassy material together in the homogenized mixture allowing for extrusion of the mixture. Generally, such plasticizers are organic compounds such as cellulose and cellulose derivatives.

Slag:

A non-metallic waste product resulting from the interaction of flux and impurities in the melting and refining of metals.

Solvent:

Any liquid material, such as water or organic solution, in which the plasticizer of the present invention is soluble and swellable. Typical solvents include water or alcohols such as methanol, ethanol, isopropanol, etc.

Tile:

An article which is a curved or a flat plate, and may be of any variety of shapes including squares, rectangles, or other regular or irregular shapes, that is appropriately sized and shaped for use in walls, ceilings, or floors as a resilient covering.

Water Glass:

Water soluble glasses, examples of which include, but are not limited to, $Na_2SiO_3$ and $K_2SiO_3$.

The subject of the invention is to an industrial precursor, which can be stored indefinitely, and used to produce a construction material such as a tile, slab or other decorative material. Such construction materials will comprise one or more layers, and can be used as an external tiling for buildings, industrial and residential areas, health facilities, or for floors thereof.

The industrial precursor comprises a glassy material, a plasticizer, and a solvent. Preferably, the industrial precursor is free of such additives as sand or mineral materials such as sandstone, granite, ground brick or ceramic materials such as broken porcelain or mica.

The glassy material is typically glass particles, or slag particles, with the preferred material being either post-consumer or industrial waste glass. The glass or slag is ground into uniform particle sizes, generally having the size of less than 5 mm, preferably having an average size of 1 mm or less. The glass may be colored glass or clear glass. The ground glass is mixed with a plasticizer and a solvent. Typically, the industrial precursor will comprise 70–85% glassy material by weight, preferably 75–80% glassy material by weight; 3–8% plasticizer by weight, preferably 4–6% plasticizer by weight and 15–25% solvent by weight, preferably 18–24% solvent. The amounts of each material will vary depending upon choice of glassy material, plasticizer and solvent.

Surprisingly and unexpectedly, it has been determined in accordance with the invention that the addition of the plasticizer to a mixture of a glassy material and solvent will result, upon mixing and homogenization, in an industrial precursor that can be stored indefinitely and used to produce resilient construction materials such as tiles or slabs which may be used in place of natural stone tiles. The plasticizer acts as an organic binder, to hold together the glassy material, and enable the processing of the glassy materials by extrusion. During thermal treatment of the industrial precursor to produce the tile, the plasticizer is burned off from the precursor material in a gradual manner at temperatures of less than 500° C.

A solvent is used to solubilize and swell the plasticizer which helps to hold the glassy material particles together in a homogenous mixture. The solvent, which may be any organic liquid or water, is preferably water or an alcohol if an organic solvent is used.

The plasticizer and glassy material may be mixed together initially, followed by the addition of the solvent and further homogenization. Alternatively, the solvent and plasticizer may be mixed together initially to dissolve and swell the plasticizer within the solvent and the solvent containing the dissolved plasticizer may then be added to the glassy material. Mixing usually occurs by any method well-known in the art, with a preferred method via rotary dry-wet mixer. In a preferred embodiment, the mixing is performed as follows. Dry glassy material, plasticizer and any optional ingredients are placed into the mixer. This dry mixture is then mixed in a dry state at room temperature for about 2–15 minutes, preferably about 5 minutes. Then solvent is added into the dry mixture and the new mixture is wet mixed for about 20 minutes, preferably about 10 minutes, at temperatures in the range of 20° C.–45° C., preferably 25° C.

After mixing, the materials may be allowed to stand for several days, preferably 5 hours to allow for further homogenization. This is followed by extrusion by any means well-known in the art. In a preferred embodiment, the materials are extruded through a blend extruder at a temperature between 20° C.–60° C. The extruder mouth is generally equipped with hollows in which the industrial precursor is shaped to a chosen shape, preferably a cylindrical form. The speed of extrusion is determined by the model of the extruder; typically, the speed is in the range of 300 kg/hour. Alternatively, the material may be mixed and immediately extruded, without allowing additional time for homogenization.

Immediately following extrusion, the industrial precursor is cut or ground into pellets. These pellets may be cylindrical particles having a diameter from 3–15 mm, preferably 5 mm, and length from 3–15 mm, preferably 6 mm. These particles are then dried and can be ground into smaller pieces, generally 1–3 mm, preferably 2 mm, in diameter.

The industrial precursor is then dried to remove excess moisture via heat drying or freeze drying techniques well known in the art. In a preferred embodiment, a continuous belt dryer is used. The drying conditions are preferably: (1) temperature of drying 100–180° C., preferably 130° C.; (2) air relative humidity 30–80%, preferably 40%; and (3) speed of drying 500 kg of material/hour. Alternatively, the material may be extruded then dried prior to its being either ground into particles or cut into rods.

The industrial precursor may also contain optional ingredients including colorants. The addition of various colorants to individual batches of the industrial precursor will allow industrial precursors of various colors to be produced such that, when combined with other batches of the industrial precursor that contain different colorants, construction materials can be produced which simulate various natural and artificial stones. The colorants are generally added in the amounts of 0.1–15% by mass of the glassy material, preferably 2–5% by mass. The present process avoids problems known in the art with difficulty in forming construction materials from differently colored glass particles due to different thermal expansion coefficients between the glass particles. The use of glass particles having different thermal expansion coefficients to form tiles results in a construction material having reduced mechanical strength. The problem of different thermal expansion coefficients among the glassy material used to form the construction material is avoided in the present invention due to the negligible amount of colorant used for coloring in the invention. The small amounts of colorants utilized in the present invention do not significantly alter the thermal expansion coefficient of the glassy material used. The colorant may be added to the solvent and plasticizer mixture prior to addition of the glassy material or, alternatively, the colorant may be added after the plasticizer, glassy material and solvent have been mixed together.

Additionally, a fixing agent may be added in addition to or in lieu of a colorant. The fixing agent is added in a quantity of from preferably about 0.5–3.5% by weight, most preferably about 1.8% by weight of the glassy material. The addition of a fixing agent to the industrial precursor will produce a sharp and fine distinction between the colors of the different industrial precursors used to produce a construction material. The presence of the fixing agent prevents diffusion of colors after thermal processing and sintering of the industrial precursor, whereas if a fixing agent is not present, the diffusion boundaries between the colors are blurred resulting in a smooth transition of colors as seen in many natural stone tile products.

Following homogenization of all of the ingredients in the industrial precursor, the industrial precursor is extruded, cut into rods or ground into pellets, and dried in the manner previously described.

The dried industrial precursor may be stored for an indefinite amount of time until it is required for production of construction materials such as tiles, slabs, or other materials such as sculptures, decorative images, or other similar uses.

To produce a construction material from the industrial precursor of the present invention, the pelleted industrial precursor is placed in a heat-resistant mold, either as a single layer of one or more differently colored industrial precursors or, alternatively, a first layer of industrial precursor may be placed in the mold and a second layer comprising one or more batches of industrial precursors having different colors may be arranged on the first layer to produce a distinctive pattern.

The heat-resistant mold can be of various shapes including a plate or a cylinder. The plate may have a flat, convex or concave surface. The heat-resistant mold is preferably made of ceramic or metallic material. The heat-resistant mold generally has the same or smaller coefficient of thermal expansivity than that of the construction material used. The inner surface of the mold may optionally be covered with a fluid solution of kaolin. Kaolin will not sinter during the thermal treatment of the industrial precursor to produce a construction material and facilitates the removal of the final product out of the mold. The layer or layers are arranged for a required thickness of the final construction material product. The thickness of the construction material is generally from 10 to 50 mm, preferably 15 mm. In the case of a two layered construction material, the top layer thickness may optionally be 1–7 mm, preferably 3 mm. These layers may optionally be compacted by press or by vibration.

Thermal treatment is then carried out in a kiln with defined regimes of heating and cooling, or in a continuous heating kiln. A preferred kiln is a single layer roller kiln. In the initial part of thermal processing, the industrial precursor is generally heated from ambient temperature to about 600° C. at a speed of about 20° C./minutes followed by 20 min. dwell at this temperature. During this initial thermal processing, the plasticizer burns off. The temperature is then increased to about 1150° C. by a speed of about 20° C./minute, followed by maintaining this temperature for 15 minutes to sinter the industrial precursor into the resulting construction material. Then the temperature is generally decreased to about 600° C. by a speed of 60° C./minute and then slowly decreased to about 120° C. by speed of 1.2° C./minute. The temperature is then decreased down to ambient temperature to form the finished construction material.

The resulting construction material produced is preferably a non-foamed tile, i.e, the tile has a specific gravity of 98% of the density of used glassy material.

The invention is further described in the following non-limiting examples.

EXAMPLE 1

Production of An Industrial Precursor and Construction Material Using Carboxymethylcellulose as a Plasticizer A finely ground powder of clear window glass (96 kg), with a particle size less than 1 mm, was mixed with 4 kg of carboxymethylcellulose for 10 minutes and homogenized in a dry-wet mixer (model SM 35, VET Svida, Czech Republic). Water was then added into the mixer in an amount of 20% by weight of the mixture, and the mixture further homogenized for 5 minutes until a plastic-like mixture was obtained. The mixture was then extruded to thin rods via a blend extruder (SLV 110, VET SVIDA, Czech Republic) at a temperature of 35° C. at a speed of 300 kg/hour. The rods were then dried to constant mass on a continuous belt dryer (model KPS 500, VET Svida, Czech Republic) at 130° C., with an air humidity of 40%, at a rate of 300 kg/hour.

After drying, the industrial precursor rod pellets were placed into ceramic heat-resistant molds. The molds were placed in a single layer roller kiln (OK 18/1200, Italforni s.r.l., Via G. Rosa, Formigine, Italy) for thermal treatment. In the initial part of thermal processing, the industrial precursor was heated from ambient temperature to 600° C. at a speed of 20° C./minute followed by a 15 minute holding at this temperature. During processing the plasticizer burned off. The temperature was then increased to 1150° C. by a speed of 20° C./minute. The temperature of 1150° C. was held for 15 minutes to sinter the industrial precursor into the resulting construction material. The temperature was then decreased to 600° C. at a speed of 60° C./minute and then slowly decreased to 120° C. at a speed of 1.2° C./minute. The temperature was then decreased down to ambient temperature to form the finished construction material. The construction material exhibited a minimum of bubbles and pores on its outer surface.

EXAMPLE 2

Production of an Industrial Precursor and Construction Material Using Methylcellulose as a Plasticizer A finely ground powder of clear window glass (97 kg), with a particle size less than 1 mm, was mixed with 3 kg methylcellulose for 15 minutes at 25° C. and homogenized in a rotary dry-wet mixer. (model SM 35, VET Svida, Czech Republic). Water was then added into the mixer in an amount of 20% by weight of the mixture, and the mixture further homogenized for 5 minutes until a plastic-like mixture was obtained. The mixture was then extruded to thin rods via a blend extruder (SLV 110, VET SVIDA, Czech Republic) at a temperature of 35° C. at a speed of 300 kg/hour. The rods were then dried to constant mass on a continuous belt dryer (model KPS 500, VET Svida, Czech Republic) at 130° C., with an air humidity of 40%, at a rate of 300 kg/hour.

After drying, the industrial precursor rod pellets were placed into ceramic heat-resistant molds. The molds were placed in a single layer roller kiln (OK 18/1200, Italforni s.r.l., Via G. Rosa, Formigine, Italy) for thermal treatment. In the initial part of thermal processing, the industrial precursor was heated from ambient temperature to 600° C. at a speed of 20° C./minute followed by 20 minute holding at this temperature. During processing the plasticizer burned off. The temperature was then increased to 1150° C. by a speed of 20° C./minute. The temperature of 1150° C. was held for 15 minutes to sinter the industrial precursor into the resulting construction material. The temperature was then decreased to 600° C. at a speed of 60° C./minute and then slowly decreased to 120° C. at a speed of 1.2° C/minute. The temperature was then decreased down to ambient temperature to form the finished construction material. The construction material exhibited a minimum of bubbles and pores on its outer surface.

EXAMPLE 3

Production of an Industrial Precursor and Construction Material Using Methylcellulose and Carboxymethylcellulose as Plasticizer A 96 kg finely ground powder of clear window glass, with a particle size of less than 1 mm, was mixed with 2 kg methylcellulose and 2 kg carboxymethylcellulose for 15 minutes and homogenized in a mixer. (model SM 35, VET Svida, Czech Republic). Water was then added into the mixer in an amount of 18% by weight of the mixture, and the mixture further homogenized for 5 minutes until a plastic-like mixture was obtained. The mixture was then extruded to thin rods via a blend extruder (SLV 110, VET SVIDA, Czech Republic) at a temperature of 35° C. at a speed of 300 kg/hour. The rods were then dried to constant mass on a continuous belt dryer (model KPS 500, VET Svida, Czech Republic) at 130° C., with an air humidity of 40%, at a rate of 300 kg/hour.

After drying, the industrial precursor rod pellets were placed into ceramic heat-resistant molds. The molds were placed in a single layer roller kiln (OK 18/1200, Italforni s.r.l., Via G. Rosa, Formigine, Italy) for thermal treatment. In the initial part of thermal processing, the industrial precursor was heated from ambient temperature to 600° C. at a speed of 20° C./minute followed by 20 minute holding at this temperature. During processing the plasticizer burned off. The temperature was then increased to 1150° C. by a speed of 20° C./minute. The temperature of 1150° C. was held for 15 minutes to sinter the industrial precursor into the resulting construction material. The temperature was then decreased to 600° C. at a speed of 60° C./minute and then slowly decreased to 120° C. at a speed of 1.2° C./minute. The temperature was then decreased down to ambient temperature to form the finished construction material. The construction material exhibited a minimum of bubbles and pores on its outer surface.

EXAMPLE 4

Production of an Industrial Precursor and Construction Material Via Additional Homogenization Using Carboxymethylcellulose as a Plasticizer An industrial precursor was prepared by mixing carboxymethylcellulose, glass and water according to Example 1, and the mixture allowed to stand for 10 hours following homogenization. The industrial precursor was then processed into a construction material according to the method of Example 1.

EXAMPLE 5

Production of an Industrial Precursor and Construction Material Via Additional Homogenization Using Methylcellulose as a Plasticizer An industrial precursor was prepared by mixing methylcellulose, glass and water according to Example 2, and the mixture allowed to stand for 10 hours following homogenization. The industrial precursor was then processed into a construction material according to the method of Example 2.

EXAMPLE 6

Production of a Colored Industrial Precursor and Construction Material Using Carboxymethylcellulose as a Plasticizer An industrial precursor was prepared by mixing carboxymethylcellulose, glass and water according to Example 1, with the addition of 2.5% mass of yellow inorganic pigment (K 959 91, Glazura Roudnice nad Labem a.s., Czech Republic) (based to mass of the glass) and the mixture mixed according to the method of Example 1. The industrial precursor was then processed into a construction material according to the method of Example 1.

EXAMPLE 7

Production of a Colored Industrial Precursor and Construction Material Using Methylcellulose as a Plasticizer An industrial precursor was prepared by mixing methylcellulose and glass according to Example 2, with the addition of 2.5% mass of black inorganic pigment (based to mass of the glass)(K 820 91, Glazura Roudnice nad Labem a.s., Czech Republic) and the dry materials mixed for 10 minutes, and then homogenized in a mixer according to the method of Example 2. The industrial precursor was then processed into a construction material according to the method of Example 2.

EXAMPLE 8

Production of w Colored Industrial Precursor and Construction Material Using Water Glass as a Fixing Agent Two separate batches of industrial precursor were prepared by the methods according to Examples 6 and 7, with the addition of 3% mass of water glass (based to mass of the glass) ($Na_2SiO_3$) added to each mixture, and each mixture mixed according to the method of Example 1. Each industrial precursor was placed in a heat-resistant mold, such that a pattern was formed by the different colored industrial precursor. The industrial precursor was then processed into construction materials according to the method of Example 1, and the resulting construction material showed a sharp boundary between the colors contained therein.

EXAMPLE 9

Production of A Colored Industrial Precursor and Construction Material Using Titanium Dioxide as a Fixing Agent Two separate batches of industrial precursor were prepared by the methods according to Examples 6 and 7, with the addition of 3% mass of titanium dioxide (based to mass of the glass) added to each mixture, and each mixture mixed according to the method of Example 1. Each industrial precursor was placed in a heat-resistant mold, such that a pattern was formed by the different colored construction material. The industrial precursor was then processed into a construction material according to the method of Example 1, and the resulting construction material showed a sharp boundary between the colors contained therein.

EXAMPLE 10

Production of Black and Yellow Construction Material

Two separate batches of industrial precursor were prepared by the methods according to Examples 6 and 7, and mixed together in a ratio of 3:1. This mixture of industrial precursor was placed in a heat-resistant mold and thermally treated according to Example 1. The resulting construction material produced exhibited black dots on a yellow background.

It is understood that the invention is not limited to the particular embodiments described herein as illustrative, but embraces all such modified forms thereof as come within the scope of the following claims.

What is claimed is:

1. A method of producing an industrial precursor, comprising the steps of:
    (a) mixing together materials sufficient to form a semi-solid product, the materials consisting essentially of:
        (i) waste glass;
        (ii) a plasticizer;
        (iii) a solvent;
        (iv) optionally slag;
        (v) optionally a colorant;
        (vi) optionally a fixing agent to form the semi-solid product, wherein the plasticizer and the waste glass are mixed together prior to the addition of the solvent;
    (b) extruding the semi-solid product;
    (c) drying the semi-solid product at a temperature of between 100° C. to 180° C. to form an industrial precursor, wherein the industrial precursor is capable of being sintered into a tile.

2. The method according to claim 1, wherein the waste glass is ground waste glass particles.

3. The method according to claim 2, wherein the ground glass particles have an average size of 1 millimeter or less, the plasticizer is selected from the group consisting of cellulose and cellulose derivatives, and the solvent is selected from the group consisting of water and alcohols.

4. The method according to claim 3, wherein the cellulose derivative is selected from the group consisting of carboxycellulose, carboxymethylcellulose, sodium carboxymethylcellulose, hydroxypropylcellulose and carboxomethylhydroethylcellulose, and the solvent is water.

5. The method according to claim 1, wherein the fixing agent is selected from the group consisting of water glass, inorganic sols, and metal alkoxides.

6. The method according to claim 4, wherein the fixing agent is selected from the group consisting of water glass, inorganic sols, and metal alkoxides.

7. The method according to claim 1, further comprising the additional step of:
    (d) grinding the industrial precursor into pellets.

8. The method according to claim 1, further comprising the additional step of:
    (d) cutting the industrial precursor into rods.

9. A method of producing an industrial precursor, comprising the steps of:
    (a) mixing together materials to form a semi-solid product, the materials comprising:
        (i) waste glass;
        (ii) a plasticizer;
        (iii) a solvent;
        (iv) optionally a colorant;
        (v) optionally a fixing agent, to form the semi-solid product;
    (b) extruding the semi-solid product;
    (c) drying the semi-solid product to form an industrial precursor; and
    (d) sintering the industrial precursor in a mold to form a tile.

10. The method according to claim 9, wherein the waste glass is ground waste glass particles.

11. The method according to claim 10, wherein the ground glass particles have an average size of 1 millimeter or less, the plasticizer is selected from the group consisting of cellulose and cellulose derivatives, and the solvent is selected from the group consisting of water and alcohols.

12. The method according to claim 11, wherein the cellulose derivative is selected from the group consisting of carboxycellulose, carboxymethylcellulose, sodium carboxymethylcellulose, hydroxypropylcellulose and carboxomethylhydroethylcellulose, and the solvent is water.

13. The method according to claim 9, wherein step (a) comprises the addition of a fixing agent to form the semi-solid product.

14. The method according to claim 13, wherein the fixing agent is selected from the group consisting of water glass, inorganic sols, and metal alkoxides.

15. The method according to claim 9, wherein step (a) comprises the addition of a colorant to form the semi-solid product.

16. The method according to claim 13, wherein step (a) comprises the addition of a colorant to form the semi-solid product.

17. The method according to claim 7, further comprising the steps of:

(e) placing a first layer of the pellets in a mold;

(f) placing a second layer of the pellets in the mold directly on top of the first layer;

(g) sintering the first and second layers to produce a tile.

18. The method according to claim 8, further comprising the steps of:

(e) placing a first layer of the rods in a mold;

(f) placing a second layer of the rods in the mold directly on top of the first layer;

(g) sintering the first and second layers to produce a tile.

* * * * *